Patented Mar. 2, 1943

2,313,033

UNITED STATES PATENT OFFICE 2,313,033

SALAD DRESSING

Morris H. Joffe, Chicago, Ill., assignor to The Emulsol Corporation, Chicago, Ill.

No Drawing. Application February 6, 1941, Serial No. 377,741

18 Claims. (Cl. 99—144)

This invention relates to salad dressings of the type which usually contains oleaginous material, aqueous material, egg material, and condiments and spices, and wherein starch is employed as a bodying and thickening agent.

Such salad dressings are commonly made by preliminarily preparing a starch paste of the desired consistency by cooking the starch with aqueous material such as water and vinegar, and incorporating said paste into an emulsion containing a vegetable oil, egg material, sugar, vinegar and spices. The proportions may be adjusted to produce a finished dressing containing from about 15% to about 50% of oil. The amount of the starch paste employed is governed by the amount of oil desired in the finished salad dressing. In the preparation of the starch paste, it is the usual practice to employ approximately one pound of starch to one gallon of aqueous liquid containing vinegar, and to heat to elevated temperatures to gelatinize the starch. In general, the concentration of starch in the paste varies from about 8% to about 12½%, the variation depending on the consistency desired.

The salad dressings prepared in the manner described hereinabove possess various deficiencies. In many instances, the products possess a pudding-like appearance and exhibit a starchy taste or flavor. On standing over varying periods of time, as, for example, on grocers' shelves or the like, the products fall away from the sides of the jars in which they are packed, the emulsions break and there is a separation of liquids resulting in an unsightly product, not to speak of one whose utility or desirability is greatly impaired. The break-down of the emulsion is accentuated by low temperatures such as are not infrequently encountered under storing and shipping conditions.

In order to improve salad dressings of the type described hereinabove, it has been suggested to employ such products as gum tragacanth, gum arabic, gelatin, gum karaya and the like. While, in certain cases, the use of such materials brings about certain improvements, their employment leaves much to be desired.

In accordance with the present invention, salad dressings of the type discussed hereinabove are decidedly improved in a simple and effective manner. These improvements may be briefly outlined as (1) enabling the use of only a minimum amount of starch and at the same time obtaining a better viscosity and plasticity in the finished salad dressing together with avoidance of starchy flavor or taste, (2) enabling the production of a salad dressing which, on relatively prolonged standing, will not gel and break away from the sides of the glass jar in which it is packed, and wherein syneresis and the separation of aqueous liquids, particularly with lowering and raising of temperatures, is effectively inhibited, (3) resulting in the production of salad dressings of improved taste and flavor and smooth texture and Vaseline-like consistency, and (4) enabling the production of salad dressings of excellent taste with a relatively low oil content and having a smoother consistency than salad dressings as heretofore prepared with relatively high oil contents.

In general, the present invention is predicated on the use of carob or locust bean gum, with or without a minor proportion of psyllium seed gum. It has been discovered that if carob gum, or carob gum together with a minor proportion of psyllium seed gum, is employed under carefully controlled conditions, as hereinafter set forth in detail, the material improvements described hereinabove result.

Carob or locust gum varies in viscosity depending upon its source and the time and the conditions under which it may have been prepared, stored or shipped. It has been found that carob gum deteriorates on standing and that this deterioration manifests itself, among other ways, by a reduction of its viscosity when dissolved or dispersed in aqueous media. It has also been found that the amount of carob gum utilized, though variable, must be within relatively narrow limits in order to obtain satisfactory results and that the amount to be employed depends upon its protective colloid characteristics. A recognition of these factors and the further discovery that the amount of the carob gum to be employed appears to be generally a logarithmic function of the viscosity thereof have enabled uniformly good results to be obtained in accordance with the invention. Thus, for example, if a given carob gum having a viscosity of 50 units on a MacMichael viscosimeter using a #27 wire gives a substantially optimum result when employed in the amount of 0.5% based on the weight of the starch paste, it would be necessary to employ about 0.625% of a carob gum whose viscosity measured 25 units on the same apparatus and 0.5375% if the viscosity is 40 units. The use of 1.0% of the carob gum having a viscosity of 25 units, under the conditions described hereinabove, would result in a product which would be relatively unsatisfactory. Commercially available carob gums vary in their viscosities from about 16 units to about 75 units as measured on the MacMichael viscosimeter. The viscosity measurement is made by preliminarily mixing 4 grams of powdered carob gum with 40 cc. of isopropyl alcohol and then adding thereto 760 cc. of water. The mixture is heated and stirred in a flask, the rate of heating being so regulated that the temperature reaches 176 degrees F. in 12 minutes whereupon such temperature is maintained for an additional 13 minutes. The solution is then cooled to 80 degrees F. and the viscosity is measured at such temperature. Since the function of the carob gum in the starch paste and in the salad dressing, prepared as described hereinafter, is a result of its colloidal properties and molecular aggregate, it is clear that the amount utilized depends upon the colloidal properties of the particular carob gum employed.

Psyllium seed gum has a much lower viscosity than carob gum and, if used alone in the salad dressing, tends to produce a rough texture and has other objectionable characteristics. It may, however, be employed with certain advantages in amounts comprising from about 8% to about 20% of the amount of the gum composition. Thus, for example, if, in accordance with my present invention, 100 pounds of carob gum is employed in the preparation of a certain quantity of salad dressing, I may utilize a mixture of 80 pounds of carob gum and 20 pounds of psyllium seed gum or a mixture of 92 pounds of carob gum and 8 pounds of psyllium seed gum or proportions falling between such values. In certain cases, the mixture of the two gums enables the employment of a lesser quantity of gum. Thus, for example, instead of using 100 pounds of carob gum, I find it feasible to employ only 92 pounds or 95 pounds of a mixture of carob and psyllium seed gum with good results being obtained.

In carrying out the invention, a starch paste is produced containing the starch or mixture of starches, the carob gum or mixture of carob gum and psyllium seed gum, and aqueous material preferably containing vinegar or acetic acid with or without an organic acid such as citric or tartaric acid. The starch paste may and for best results should contain a proportion of sugar, all as is set forth in detail hereinafter. The starch paste, which is of smooth texture and Vaseline-like consistency, is allowed to cool to room temperature and is then mixed with a desired oil, for example, a vegetable oil, eggs or egg yolks, spices and condiments, said ingredients being emulsified into the starch paste. Alternatively, the starch paste may be allowed to cool to about 80 degrees F. to 90 degrees F. and the remaining ingredients of the salad dressing, which may include oil, vinegar, spices and eggs, may be emulsified therein by any suitable emulsifying apparatus. A still further method which may be employed comprises preparing the starch paste, allowing it to cool to room temperatures and then admixing it with a previously prepared mayonnaise base emulsion containing oil, egg material, spices and the like. The procedure of making the salad dressing may be carried out by batch or continuous methods.

In the preparation of the starch paste which is utilized in the manufacture of the salad dressing, a small proportion of powdered carob gum or mixture of carob gum and psyllium seed gum is utilized which serves, among other things, to prevent syneresis of the starch paste and at the same time allows the use of a relatively small amount of starch in order to obtain the desired consistency without producing gumminess and setting in the finished salad dressing. When the ordinary starch paste, prepared in accordance with the usual practice in the prior art, is allowed to set, there is a tendency toward a change in the structure, crumbliness sometimes resulting from a shifting of the moisture from the combined to the free state. The addition of a proper amount of carob gum or mixture of carob gum and psyllium seed gum during the process of making the starch paste results in the production of a product of great smoothness and prevents the shifting of the equilibrium of the moisture or changes in the structure of the setting of the starch.

In preparing the starch paste, it is highly desirable to utilize tapioca starch as one of the ingredients, a mixture of corn starch and tapioca starch not substantially less than one fifth and preferably not substantially less than one-fourth of which comprises tapioca starch being especially satisfactory. I have also found that chlorinated starches may be used to advantage. Such starches generally possess a relatively high viscosity and, when used, the proportion thereof may be less than the amounts otherwise preferred, in certain cases being of the order of 7% based upon the weight of the starch paste. Furthermore, the presence of a certain proportion of sugar results in the production of a still better starch paste product. A range of proportions of ingredients effective to produce a good starch paste is as follows, the percentages being by weight calculated on the starch paste as a whole:

Starch_____ About 8.00% to about 9.5%
Carob gum_____ About 0.25% to about 0.6%
Sugar_____ About 10% to about 22%
Vinegar (100 grain)__ About 13% to about 15%
Water_____ Balance from about 25% to about 35% of the starch being tapioca starch and the balance corn starch. Besides the above, salt (from about 0.5% to 2.5%), spices and edible organic acids may be used.

The following examples illustrate starch paste compositions whose use falls within the scope of the invention and which give especially good results, the percentages being by weight:

Example A

| | Per cent |
|---|---|
| Vinegar (100-grain) | 14.00 |
| Water | 54.50 |
| Cane sugar | 20.00 |
| Salt | 2.25 |
| Corn starch | 6.00 |
| Tapioca | 2.00 |
| Carob gum composition [1] | 1.25 |

Example B

| | Per cent |
|---|---|
| Vinegar (100-grain) | 14.00 |
| Water | 62.25 |
| Cane sugar | 11.50 |
| Salt | 2.75 |
| Corn starch | 5.50 |
| Tapioca | 3.30 |
| Carob gum composition [1] | 0.70 |

[1] The carob gum composition comprised a mixture of 40% powdered carob gum having a viscosity of 50 units on the MacMichael viscosimeter, 1½% tartaric acid, 25% salt, 20% sugar and 13½% corn starch.

*Example C*

|  | Per cent |
|---|---|
| Vinegar (100-grain) | 14.0 |
| Water | 54.5 |
| Cane sugar | 20.1 |
| Salt | 2.2 |
| Corn starch | 6.0 |
| Tapioca | 2.0 |
| Carob gum composition [2] | 1.2 |

[2] The carob gum composition comprised a mixture of 35% powdered carob gum having a viscosity of 50 units on the MacMichael viscosimeter, 5% psyllium seed gum, 5% dried powdered lemon juice, 21½% salt, 20% sugar, and 13½% corn starch.

In preparing the starch paste, the following method may be used with advantage:

The vinegar and a part of the water are placed in a suitable jacketed kettle, most of the sugar is added, and then the carob gum composition previously admixed with the salt and the balance of the sugar, namely, about equal to that of the carob gum composition, is added, the temperature being raised to about 200 degrees F. while stirring to disperse the ingredients. The preliminary mixing of the carob gum composition with a water-soluble constituent such as the salt and a small part of the sugar serves to facilitate dispersing or dissolving the carob gum. When the temperature of 200 degrees F. is reached, the mixture of starches, made into a milky suspension with the balance of the water, is added, with stirring, at such a temperature as to reduce the temperature of the total mixture to about 185 degrees F. The stirring is continued for from 5 to 15 minutes while maintaining the temperature at about 185 degrees F. or until the product is properly gelatinized. The resulting starch paste is then withdrawn and allowed to cool to either about 80 degrees F. to 90 degrees F. or to room temperature depending upon the temperature which is to be employed in producing the finished salad dressing. The starch paste, produced as described, when cooled, is of smooth texture and of a salvy or Vaseline consistency. Alternatively, all of the ingredients of the starch paste may be mixed together at once and heated, with stirring, to produce the gelatinized product. However, more satisfactory control of starch gelatinization can be obtained by my preferred procedure.

The salad dressing is then prepared by mixing the starch paste with the remaining ingredients such as oil, eggs, condiments, spices and the like, as described generally hereinabove, in a colloid mill or other suitable emulsifying apparatus. The amount of starch paste used will vary depending upon the content of oil desired in the finished salad dressing. By way of illustration, a mayonnaise base may be prepared from 65 pounds of cottonseed oil or corn oil, 8 pounds of egg yolk, 8 pounds 2 ounces of water-vinegar mixture, 12 ounces of salt and 1 pound of mustard. To fifty pounds of such a mayonnaise base there may be added, for example, 30 pounds to 100 pounds of starch paste, or more or less, depending upon the percentage of oil desired in the finished salad dressing.

It will be noted that the carob gum used in Examples A and B hereinabove was employed in the form of a composition containing, among other ingredients, a small amount of tartaric acid. The tartaric acid appears to inhibit the deterioration of the carob gum on standing in that it seems to retard the action of the oxidases therein. Other edible organic acids, particularly hydroxy-carboxylic acids such as citric acid, may be employed in place of tartaric acid. In Example C, dried powdered lemon juice is employed as the organic acid constituent.

It has also been found that improved results are obtained if the carob gum or carob gum admixed with psyllium seed gum is pretreated, as hereinafter described, before using the same in the salad dressing. If the carob gum, for example, is mixed with a small amount of water with or without an organic acid and heated to somewhat elevated temperatures, its utility for the purposes of the present invention is enhanced. Thus, for example, to 100 pounds of powdered carob gum there are added 25 pounds of water or 25 pounds of 2% vinegar and the mass is then heated to a temperature of about 185 degrees F. for several hours or until the original moisture content of the carob gum is restored. Too much water must not be added because the carob gum may undergo such alteration as will reduce substantially its colloidal protective properties. In general, the amount of water should not substantially exceed 25% of the weight of the carob gum. In place of acetic acid in the form of vinegar, other organic acids such as tartaric acid, citric acid, malic acid and the like may be utilized. This pretreatment represents a highly useful though limited aspect of the present invention.

While the proportions of carob gum and psyllium seed gum have been set forth hereinabove as falling within the range which gives good results, it should be borne in mind that such proportions may be slightly varied depending upon the kinds of starches employed and the proportions thereof as well as upon the exact consistency desired in the finished salad dressing.

This application is a continuation-in-part of my prior application, Serial No. 262,409, filed March 17, 1939.

What I claim as new and desire to protect by Letters Patent of the United States is:

1. A salad dressing composition, effective upon incorporation into a starch-containing salad dressing to produce a salad dressing of enhanced smoothness and substantial freedom from syneresis, which comprises carob gum and an edible organic acid.

2. A salad dressing composition, effective upon incorporation into a starch-containing salad dressing to produce a salad dressing of enhanced smoothness and substantial freedom from syneresis, which comprises carob gum and an edible organic acid selected from the group consisting of citric and tartaric acids.

3. A salad dressing composition, effective upon incorporation into a starch-containing salad dressing to produce a salad dressing of enhanced smoothness and substantial freedom from syneresis, which comprises carob gum, an edible organic hydroxy-carboxylic acid, and a diluent, the diluent containing at least one material selected from the group consisting of salt, sugar and starch, the organic hydroxy-carboxylic acid comprising only a minor fraction of the amount of carob gum in said composition.

4. A salad dressing composition for admixture with oil, eggs, spices, aqueous material and the like to make a salad dressing of the starch-containing type which possesses enhanced smoothness and substantial freedom from syneresis, which comprises carob gum, starch, sugar and an edible organic acid.

5. A salad dressing starch paste, effective upon incorporation into salad dressings to impart thereto enhanced smoothness and substantial freedom from syneresis, containing starch, carob gum, sugar, acetic acid, and water, the water being present in major amount.

6. A salad dressing starch paste, effective upon incorporation into salad dressings to impart thereto enhanced smoothness and substantial freedom from syneresis, containing starch, carob gum, sugar, acetic acid, and water, the ingredients being present in substantially the following proportions by weight:

| | |
|---|---|
| Starch | About 8% to about 9.5% |
| Carob gum | About 0.25% to about 0.6% |
| Sugar | About 10% to about 22% |
| Vinegar (100-grain) | About 13% to about 15% |
| Water | Balance | not substantially less than one-fourth of the starch content being tapioca starch.

7. A salad dressing containing an oil, egg material, sugar, acetic acid, aqueous material, starch and carob gum, not substantially less than one-fourth of the total starch content being tapioca starch, and the carob gum comprising less than 0.5% by weight of the salad dressing as a whole.

8. A salad dressing containing an intimate admixture of a starch paste with a vegetable oil, egg material, and condiments, the starch paste containing from about 0.25% to about 0.6% of carob gum based on the weight of said starch paste.

9. A salad dressing starch paste, effective upon incorporation into salad dressings to impart thereto enhanced smoothness and substantial freedom from syneresis, containing, by weight, from about 8% to about 9½% of a mixture of corn starch and tapioca starch, from about 10% to about 22% of sugar, the amount of tapioca starch comprising between about 25% and about 35% of the total starch content, and between about 0.25% and 0.6% of carob gum.

10. A salad dressing containing an intimate admixture of a starch paste with a vegetable oil, egg material, and condiments, the starch paste containing, by weight, from about 8% to about 9½% of starch, from about 10% to about 22% of sugar, and between about 0.25% and 0.6% of carob gum.

11. A method of enhancing the utility of carob gum for use in starch-containing salad dressings which comprises adding to the carob gum a small amount of aqueous material and heating the same at elevated temperatures under such conditions as not to substantially decrease its viscosity.

12. The method of claim 11 wherein the aqueous material does not substantially exceed about 25% by weight of the carob gum and the temperature is of the order of 185 degrees F.

13. A salad dressing composition, effective upon incorporation into a starch-containing salad dressing to produce a salad dressing of enhanced smoothness and substantial freedom from syneresis, which comprises carob gum, a water-soluble edible constituent, and starch.

14. A salad dressing composition, effective upon incorporation into a starch-containing salad dressing to produce a salad dressing of enhanced smoothness and substantial freedom from syneresis, which comprises carob gum, a substantially lesser amount of psyllium seed gum, a water-soluble edible constituent, and starch.

15. A pulverulent salad dressing composition, effective upon incorporation into a starch-containing salad dressing to produce a salad dressing of enhanced smoothness and substantial freedom from syneresis, which comprises carob gum and dried, powdered lemon juice.

16. A pulverulent salad dressing composition, effective upon incorporation into a starch-containing salad dressing to produce a salad dressing of enhanced smoothness and substantial freedom from syneresis, which comprises carob gum, psyllium seed gum in amounts from about 8% to about 20% by weight of the mixture of gums, dried, powdered lemon juice, starch and sugar.

17. A salad dressing containing oil, egg material, sugar, edible organic acid, aqueous material, starch and carob gum, not less than 20% of the total starch content being tapioca starch, and the carob gum comprising less than 0.5% by weight of the salad dressing as a whole.

18. A salad dressing containing an intimate admixture of a starch paste with a vegetable oil, egg material, and condiments, the starch paste containing from about 0.25% to about 0.6%, based on the weight of the starch paste, of a mixture of carob gum and psyllium seed gum, the psyllium seed gum constituting from about 8% to about 20% of weight of the mixture of gums, and not less than 20% of the starch being tapioca starch.

MORRIS H. JOFFE.